United States Patent [19]
Rhodes

[11] 3,789,319
[45] Jan. 29, 1974

[54] HYDROGEN ROTATION-VIBRATION OSCILLATOR

[75] Inventor: Charles K. Rhodes, Pleasanton, Calif.

[73] Assignee: The United States of America as represented by the United States Atomic Energy Commission, Washington, D.C.

[22] Filed: May 8, 1972

[21] Appl. No.: 250,997

[52] U.S. Cl............................... 331/94.5, 330/4.3
[51] Int. Cl............................ H01s 3/22, H01s 3/09
[58] Field of Search...................... 331/94.5; 330/4.3

[56] References Cited
UNITED STATES PATENTS
3,702,973  11/1972  Daugherty et al. ................ 331/94.5

OTHER PUBLICATIONS
CRC Handbook of Lasers, Pub. by Chem. Rubber Co. Press, Cleveland, Ohio, Nov. 29, 1971, pp. 319–322 & pp. 347–349.

*Primary Examiner*—Ronald L. Wibert
*Assistant Examiner*—R. J. Webster
*Attorney, Agent, or Firm*—John A. Horan; Frederick A. Robertson; S. E. Carnahan

[57] ABSTRACT

A laser system wherein molecular species of hydrogen and hydrogen isotopes are induced to oscillate on rotational-vibrational levels by subjecting the hydrogen to a transverse beam of electrons of a narrowly defined energy between about 1 and 5 eV, thereby producing high intensity and high energy output.

8 Claims, 2 Drawing Figures

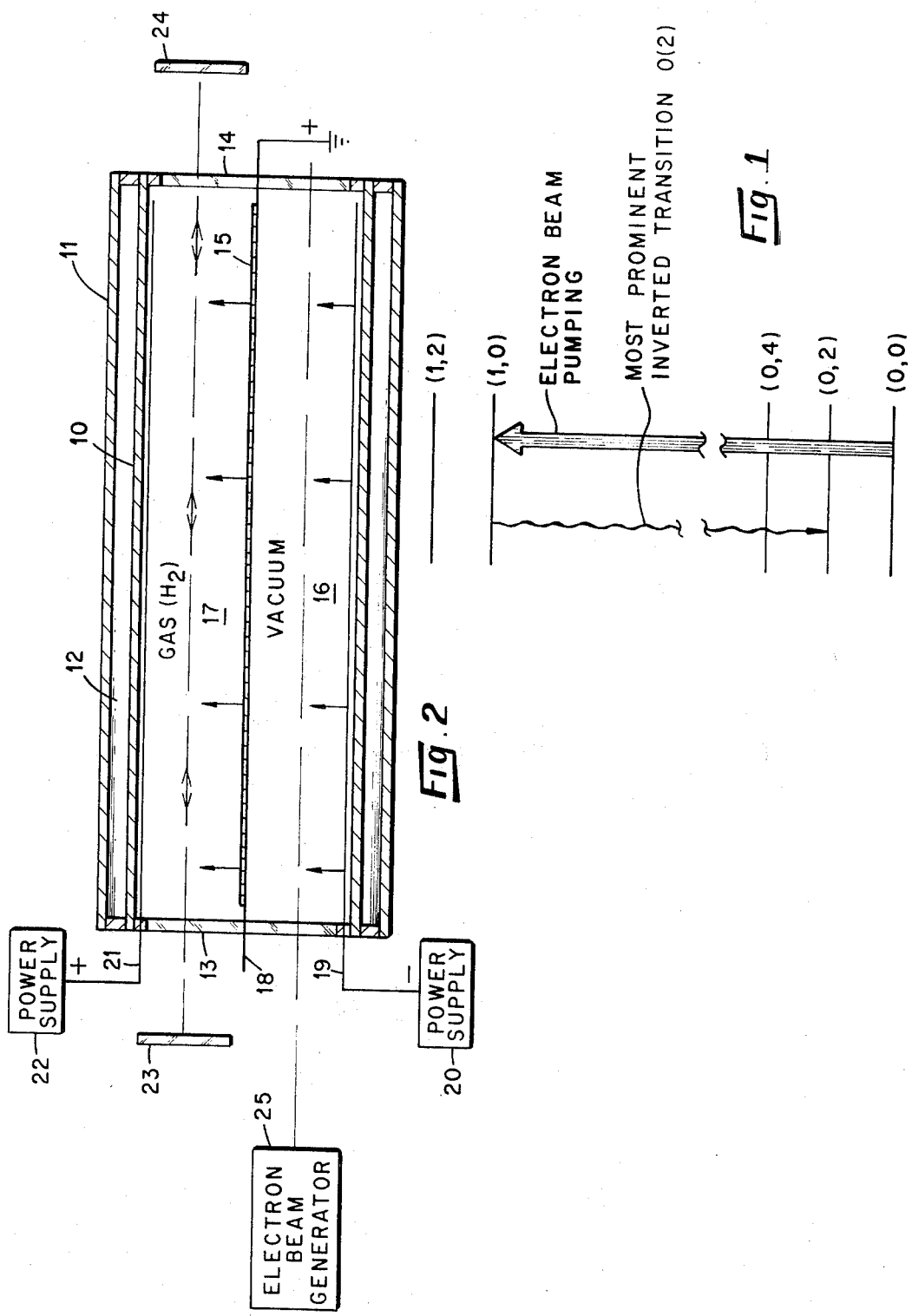

HYDROGEN ROTATION-VIBRATION OSCILLATOR

BACKGROUND OF THE INVENTION

The invention described herein was made in the course of, or under, Contract No. W-7405-ENG-48, with the United States Atomic Energy Commission.

This invention relates to laser systems, particularly to laser systems which utilize an electron beam device for activating the lasing medium, and more particularly to such a laser system where molecular species of hydrogen and hydrogen isotopes are induced to oscillate on rotational-vibrational levels by subjecting such medium to a transverse beam of electrons of a narrowly defined energy, thereby producing high intensity and high energy output.

While electron beam activated laser systems are known in the art, the output intensities and energies of presently available laser systems may not be of sufficient magnitude to provide the outputs required for successful nuclear fusion applications.

SUMMARY OF THE INVENTION

The present invention provides a laser system capable of high intensity and energy output, this being accomplished by inducing the molecular species of hydrogen and hydrogen isotopes to oscillate on rotational-vibrational levels. In the inventive system, molecular hydrogen of the species $H_2$, $D_2$, HD, HT or DT is disposed in an optically resonant cavity, at a temperature in the vicinity of 77°K, in the form of a solid, liquid or gas, particularly gas, at a pressure of about 10 atmospheres, and subjecting the thus disposed hydrogen species to a transverse beam of a narrowly defined energy between about 1 and 5 eV, whereby population inversion, and consequent oscillation on rotational-vibrational energy levels of the hydrogen species are met, providing a laser system capable of high intensity and energy output.

Therefore, it is an object of this invention to provide a laser system having high intensity and high energy output.

A further object of the invention is to provide a laser system wherein molecular species of hydrogen and hydrogen isotopes are induced to oscillate on rotational-vibrational levels.

Another object of the invention is to provide a laser system which subjects molecular species of hydrogen and hydrogen isotopes to a transverse beam of electrons of a narrowly defined energy between about 1 and 5 eV.

Another object of the invention is to provide a laser system which utilizes molecular hydrogen of the species $H_2$, $D_2$, HD, HT or DT.

Another object of the invention is to provide a double-discharge type of laser system wherein molecular species of hydrogen and hydrogen isotopes are induced to oscillate on rotational-vibrational levels thereby producing high intensity and high energy output.

Other objects of the invention will become apparent from the following description and accompanying drawing.

BRIEF DESCRIPTION OF THE DRAWING

FIG. 1 illustrates the pertinent energy levels for the para-$H_2$ oscillator system.

FIG. 2 schematically illustrates an embodiment of the inventive hydrogen rotation-vibration oscillator.

DESCRIPTION OF THE INVENTION

The output intensities and energies of presently available laser systems may not be of sufficient magnitude to provide the outputs required for successful nuclear fusion applications. Moreover, undesirable nonlinear optical effects, such as self-focussing and Raman effects, can be expected to play a limiting role in the quest for laser systems of increased output intensities, since the magnitude of the fields associated with electromagnetic radiation of such intensities is of the same order as the atomic fields of the materials involved. These considerations impart special significance to laser systems, wherein the lasing medium consists of materials other than the most symmetrical and tightly bound systems (e.g., He and $H_2$). This is so because, for these materials, the maximum spacing $\Delta\omega$ of the energy levels is not sufficiently large, and for the coupling constant $\mu$ (e.g., dipole moment) not sufficiently small, to adequately suppress nonlinear effects. For example, the Raman emission rate is given by: (assuming $\Delta\omega >> \neq$ , the linewidth)

$$R \cong (\mu Ep/\hbar\Delta\omega)^2 A$$

where A is the allowed rate, so that $\mu Ep/\hbar\Delta\omega$ must be much less than unity to render $R << A$. Since Ep and $\hbar$ are constants, the requirements to maximize $\Delta\omega$ and minimize $\mu$ readily follow.

The lasing system of this invention is that of molecular hydrogen, more specifically, homonuclear molecular hydrogen, $H_2$ and $D_2$, and isotopically mixed molecular hydrogen HD, HT and DT. Not only are these materials of the diatomic type, but are also isoelectronic with helium, the system in which nonlinear effects are known to be minimal. The expectation that nonlinearity will be minimized is further supported by the absence of allowed (dipole approximation) vibrational-rotational bands and level spacings of maximum extent possible for molecular materials.

While homonuclear hydrogen, e.g., $H_2$ and $D_2$, has no dipole moment (either static or transitional) at all, and isotopically mixed species of hydrogen HD, HT and DT, only a weak dipole moment, the present laser system is based upon considerations of the transitions between vibrational and rotational bands of these species, since it has been found that the quadrupole oscillator strength of homonuclear hydrogen and dipole oscillator strength of the isotopically mixed species are sufficient to be exploited for laser purposes. The system described is analogous to classical three-level systems, and may be represented as follows:

| Para-ground state | Electron beam | Pump | Short-lived transient species | Spontaneous decay | Vibr. excited species | Stimul. emission | Vibr. ground state |
|---|---|---|---|---|---|---|---|
| $H_2$ + $e^-$ | | → | $H_2^{-*}$ | → | $H_2^*$ + $e^-$ | → | $H_2$ + $e^-$ |

The lasing system described herein and carried out in the FIG. 2 apparatus, involves electron beam-pumped molecular hydrogen. The starting material, for example, is para-hydrogen, which may be obtained by using a cryogenic system at a temperature in the vicinity of 77°K (conveniently obtained by liquid nitrogen cooling), where more than 99 percent of the hydrogen is in the para state. (It may not be necessary to fully convert to para-$H_2$; room temperature operation of normal $H_2$ may also be feasible). FIG. 1 shows the pertinent energy levels for the para-$H_2$ oscillator system, where:

$|\Delta v| = 1$ and $|\Delta j| = 2$ where $v =$ the vibrational quantum number, and $j =$ the rotational quantum number, thus $V$ and $j$ are the energy level designations.

Another energy level, not shown, is in the case where:

$|\Delta v| = 2$ (overdone emission)

The corresponding parameters for HD, for example, are:

$|\Delta v| = 1$ and $|\Delta j| = 1$

The pumping mechanism of the present invention is provided by the collisional interaction between electrons and the hydrogen molecules in the ground state. In practical terms, this means that the physical configuration of the present laser is of the electron beam device type, where the laser medium is subjected to a discharge of electrons transverse to the optical axis of the laser, as described below with respect to FIG. 2. One of the parameters which is of importance concerns the energy of the electrons, which must be controlled to be between about 1–5 eV, preferably 1–2 eV. At this energy, the cross section for vibrational excitation exceeds the cross section for rotational excitation by a factor of 6–7.

As shown in the above chart representation, the electron and the hydrogen molecule form a temporary negative ionic state $H_2^{-*}$, whose lifetime is extremely short ($\sim$ a vibrational period) and which spontaneously decays into vibrationally excited hydrogen. The transition from this state to a rotational energy leve in the vibration ground state is the basis for laser action. The usual optical resonant componentry is provided to stimulate emission from this transition.

As in other systems, the transition linewidths increase with density (pressure) of the medium. However, unlike other systems, in the present system the hydrogen gas may be operated at a very high pressure, e.g., up to about 10 atm. The significance of this high pressure value is that, in the case of hydrogen, collisional effects can be expected to produce line narrowing in this region.

Since the gain is proportional to $(\Delta n/\Delta \omega) f$, where $\Delta n$ is the inverse density, $\Delta \omega$ is the linewidth of the transition, and $f$ is the oscillator strength, the small oscillator strength of the $H_2$ rotational-vibrational transitions can be compensated by higher densities because the line is not anticipated to broaden appreciably below 10 atm. In the case of all other gaseous systems, attempts to increase optical gain by increasing pressure of the medium is defeated at a relatively low pressure ($\sim$ few torr) by collisional broadening of linewidths.

FIG. 2 illustrates an embodiment of a double discharge, electron beam activated apparatus capable of utilizing the above described lasing material, namely, molecular species of hydrogen and hydrogen isotopes. The illustrated laser oscillator comprises a housing or vessel 10 having a cooling jacket 11 in spaced relationship thereabout so as to define a cooling channel 12 in which is contained liquid nitrogen, for example, and which is connected with the necessary equipment (not shown) for circulating the coolant through channel 12. Housing 10 is closed at the ends thereof by windows 13 and 14 which are transparent to the types of energy directed therethrough, and may, if desired be composed of different materials in different portions thereof, depending on the types of energy utilized. Housing 10 is divided into two sections by a foil grid 15, such as $\sim$ 1 mm titanium, one section 16 being under vacuum, as indicated by legend, while the other section 17 contains the lasing medium, such as homonuclear molecular hydrogen ($H_2$) gas indicated by legend. Foil grid 15 is electrically connected to an electrically positive electrode 18, constituting an anode which is connected to ground. An electrode 19 located in housing section 16, constituting a cathode is negatively connected to a power supply 20 of 200 KeV, for example. Another electrode 21, located in housing section 17, constituting a second anode is positively connected to a second power supply 22 capable, for example, of producing 5 KV/cm charge on the anode 21, the anode 21 being of a higher positive potential than anode 18. A pair of mirrors or appropriate surfaces 23 and 24 are positioned in spaced relationship with the portions of windows 13 and 14, respectively, of housing section 17. An electron beam generating apparatus 25 is positioned so as to direct an electron beam through the portion of window 13 into housing section 16.

In operation of the FIG. 2 apparatus with the $H_2$ gas contained in housing section 17 at a temperature, for example, in the vicinity of 77°K and at a pressure of $\sim$ 10 atmosphere, the $H_2$ being cooled by the liquid nitrogen in cooling channel 12, as known in the art, and with the electrical power supplies activated such that the voltage is less than that required to cause electrons to flow through the vacuum space in housing 16 from cathode 19 to anode 18. Upon activation of the generating means 25, at least one pulse or beam of electron energy is directed into housing section 16 causing the flow of electrons from cathode 19 to anode 18 thereby causing secondary electrons to be driven off the foil grid 15 and directed through the $H_2$ gas in housing section 17 by the attraction to anode 21, which is more positive than anode 18. The $H_2$ gas in housing section 17 is thus subjected to a transverse beam of electrons of a narrowly defined energy between about 1 and 5 eV, whereby population inversion, and consequent oscillation on rotational-vibrational energy levels of hydrogen result, the oscillation occurring between mirrors 23 and 24, as known in the art, thereby providing a laser system capable of high intensity and high energy output.

While the above description has been directed to the use of an electron beam for initiating the lasing action, it is not intended to limit the invention to electron beam energy as the energy can be supplied by other sources, such as ultraviolet initiation.

Thus, the present invention provides a laser system wherein the lasing medium is para-hydrogen, and is based on the finding that the line narrowing effect enables the use of a normally forbidden transition, e.g., the molecular species described above, and the parameters of pressure, temperature, and the narrowly defined electron beam energy necessary to achieve pumping.

It has thus been shown that the present invention provides a high intensity, high energy laser oscillator, thereby substantially advancing the state of the art.

While particular embodiments of the lasing medium and apparatus have been illustrated and described, modifications and changes will become apparent to those skilled in the art, and it is intended to cover in the appended claims all such modifications and changes as come within the spirit and scope of the invention.

What I claim is:

1. A rotational-vibrational laser system comprising: means containing molecular hydrogen of a species selected from the group consisting of $H_2$, $D_2$, HD, HT, and DT at a pressure of about 10 atmospheres, means for maintaining said molecular hydrogen at a temperature of about 77°K, means for subjecting said molecular hydrogen to at least one beam of electrons of an energy between about 1 and 5 eV, and means associated with said containing means defining an optically resonant cavity, whereby activation of said molecular hydrogen by said electrons creates a population inversion in the hydrogen and consequent oscillation on rotational vibrational energy levels producing high intensity and high energy output.

2. The laser system defined in claim 1, wherein the molecular hydrogen is $H_2$ gas.

3. The laser system defined in claim 1, wherein said means for subjecting said molecular hydrogen to at least one beam of electrons includes an electron beam generating means for initiating said beams of electrons.

4. The laser system defined in claim 1, wherein said containing means comprises a longitudinally extending housing, wherein said temperature maintaining means includes a cooling jacket positioned in spaced relationship about wall surfaces of said housing defining a cooling channel therebetween containing a coolant, said housing being provided at opposite ends thereof with window means transparent to the types of energy directed therethrough, said housing being divided into two sections by an electrically conductive grid means, one section being under vacuum and the other section containing said molecular hydrogen; wherein said means for subjecting said molecular hydrogen to at least one beam of electrons includes a pair of electrode means in spaced relationship positioned within said other section of said housing, said grid means being operatively connected to one of said pair of electrode means, the other of said pair of electrode means being at a more positive potential than said one of said pair so as to attract electrons from said one electrode means causing same to pass transversely through said molecular hydrogen, said one section of said housing containing a cathode means positioned in spaced relationship with said one of said pair of electrode means, electron beam generating means aligned with said one section of said housing for directing a beam of energy intermediate said one of said pair of electrode means and said cathode means causing a flow of electrons from said cathode means to said one of said pair of electrode means causing secondary electrons to be driven off said grid means and directed through said molecular hydrogen contained in said other section of said housing by attraction thereof to said other of said pair of electrode means; and wherein said means associated with said containing means defining an optically resonant cavity comprises means at least partially reflective located adjacent opposite ends of said other section of said housing.

5. A method for producing a high intensity, high energy output of a laser system comprising the steps of: containing a quantity of para-hydrogen under pressure of about 10 atmospheres in an optically resonant cavity, cooling the hydrogen to a temperature of about 77°K, and directing at least one transverse beam of electrons of an energy between about 1 and 5 eV through the thus contained para-hydrogen creating a population inversion in the para-hydrogen and stimulating an emission of a coherent beam of radiation therefrom.

6. The method defined in claim 5, additionally including the step of selecting the para-hydrogen from the group consisting of $H_2$, $D_2$, HD, HT, and DT.

7. The method defined in claim 5, additionally including the step of utilizing an electron beam generating means for initiating the transverse beam of electrons through the para-hydrogen.

8. The method defined in claim 5, wherein the step of containing a quantity of para-hydrogen is carried out by containing $H_2$.

* * * * *